Figure 3:
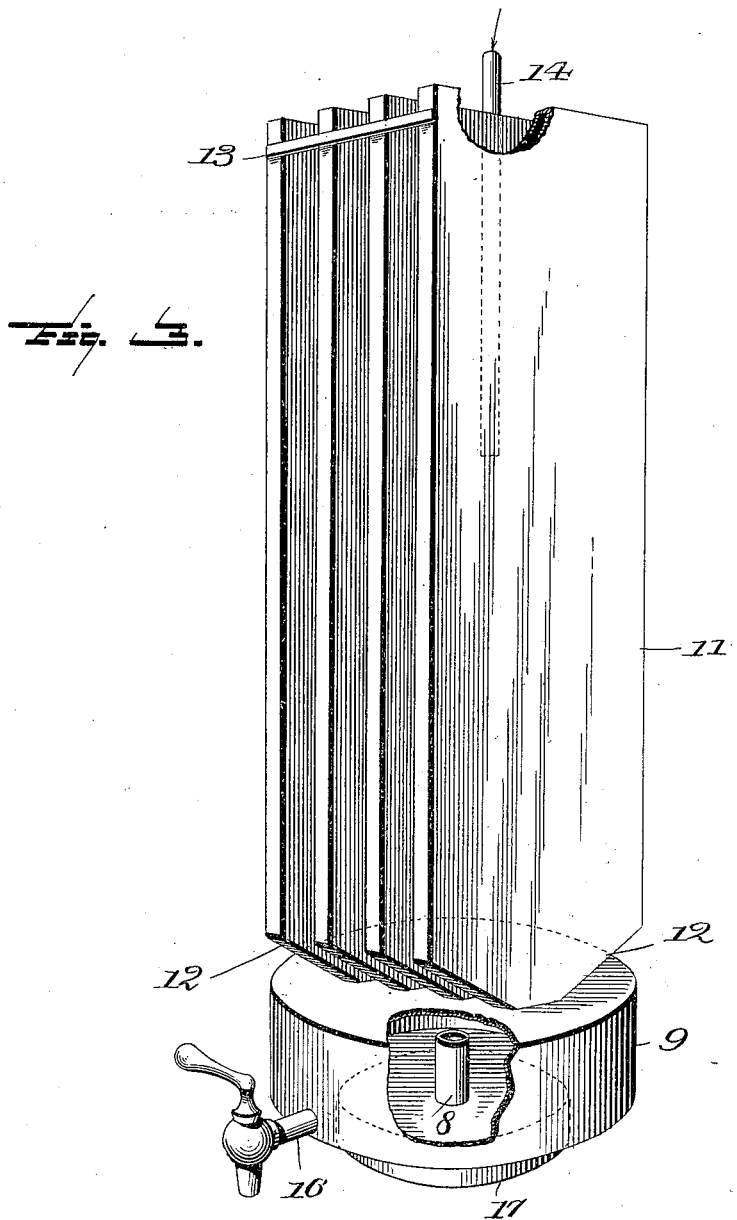

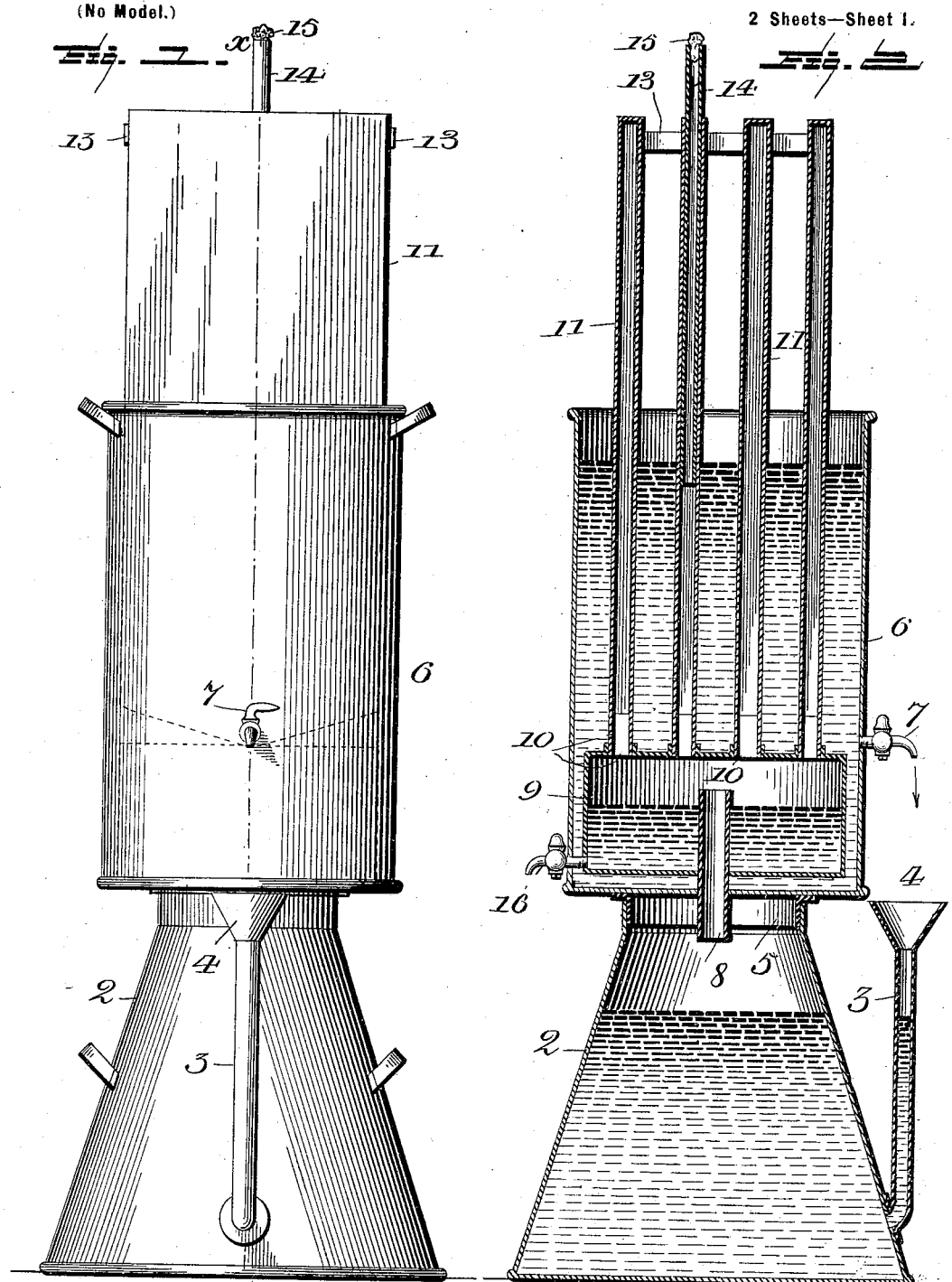

No. 627,904. Patented June 27, 1899.
J. F. CHASE.
WATER STILL AND CONDENSER.
(Application filed June 1, 1899.)
(No Model.) 2 Sheets—Sheet 2.

Witnesses
L. C. Hills
F. H. Butler

Inventor
John F. Chase
By W. A. Redmond
Attorney

UNITED STATES PATENT OFFICE.

JOHN F. CHASE, OF ST. PETERSBURG, FLORIDA.

WATER STILL AND CONDENSER.

SPECIFICATION forming part of Letters Patent No. 627,904, dated June 27, 1899.

Application filed June 1, 1899. Serial No. 718,990. (No model.)

*To all whom it may concern:*

Be it known that I, JOHN F. CHASE, a citizen of the United States, residing at St. Petersburg, in the county of Hillsborough and State of Florida, have invented certain new and useful Improvements in Water-Condensers; and I do declare the following to be a full, clear, and exact description of the invention, such as will enable others skilled in the art to which it appertains to make and use the same.

This invention relates to water-condensers, and has for its object to provide a simple, durable, and comparatively inexpensive condenser for domestic use and adapted to be used on an ordinary tea-kettle; and it consists of the parts and combinations of parts hereinafter described and claimed.

In the accompanying drawings, forming a part of this specification, Figure 1 is a front elevation of my improved condenser; Fig. 2, a vertical section on the line $x\,x$, Fig. 1; and Fig. 3, a perspective view of a modified form of my invention, having a portion of the drum and of one chamber broken away to show the location of the pipes 8 and 14.

Similar numerals refer to similar parts throughout all the views.

Referring to the drawings, the numeral 2 represents a tea-kettle having a spout 3, which is preferably vertical and provided with an enlarged funnel-shaped mouth 4. Resting on top of the kettle and having an annular flange 5 to enter the kettle is a metallic reservoir 6, preferably round in form, which is provided with a faucet 7, arranged at a suitable distance from the bottom of the reservoir and intended for drawing off the water from said reservoir. In an opening formed in the bottom of the reservoir 6 is secured a pipe or tube 8, the lower end of which extends into the kettle and the upper end through the bottom of and into a closed vessel or drum 9 and terminates at a point slightly below the top of said vessel or drum 9, as clearly shown in Fig. 2. The tube 8 is soldered or otherwise rigidly secured to both vessels and forms an air-tight joint therewith and also serves to support the drum 9 within and at a point slightly above the bottom of said reservoir 6.

Secured in any desired or suitable manner over openings 10, formed in the top of the drum 9, is a series of vertical flat chambers 11, the bottoms of which are inclined, as at 12, from each side down to the openings 10 (see Fig. 3) and which extend up through and above the top of the reservoir 6 and are connected together and braced by rods 13 near their tops.

In the top of one of the chambers 11 a pipe or tube 14 is inserted and extends down about half-way therein. In the outer end of the pipe or tube 14 is inserted a piece of sponge 15 or other suitable absorbent, such as antiseptic cotton, for a purpose to be described.

A faucet 16 is secured at one side near the bottom of the drum 9 and through the side of the reservoir 6.

In operation the kettle is supplied with the water to be distilled or purified and placed on a stove. My apparatus is then placed on the kettle, as shown, and the reservoir 6 filled with cold water. As soon as the water in the kettle is heated to the steaming-point the steam passes through the tube 8 and enters the drum and is distributed through the openings therein to the chambers 11, and the steam is cooled by the body of water surrounding said chambers and also by the atmospheric air in contact with said chambers above the reservoir 6. The condensation of the steam creates a partial vacuum in the chambers 11 and causes the air to be drawn through the tube or pipe 14 to aerate the condensed water, while the sponge insures the straining out of dust or other particles from the air before it enters the tube. The condensed water trickles into the drum and may be readily drawn therefrom by the faucet 16. As the water in the reservoir 6 becomes heated all gaseous impurities therein, which are liberated at a comparatively low temperature, pass off and the partially-purified water may be drawn off through the faucet 7 and fresh cold water supplied said reservoir.

The reservoir 6 may be so located on the kettle that the faucet 7 will empty into the funnel-shaped mouth of the spout of said kettle, and thus furnish a constant supply of hot and partially-purified water to the kettle, and for this purpose the faucet may be left partly turned on.

In Fig. 3 I show the apparatus without the surrounding reservoir for cold water and having the drum formed with an annular flange 17 for insertion in the kettle. In this form of my apparatus I depend entirely upon the atmosphere to condense the vapors.

Having thus described my invention, what I claim as new, and desire to secure by Letters Patent, is—

1. A condenser comprising a drum for the condened water having a series of vertical condensing-chambers secured to the top of and communicating with said drum, one of said chambers being open at the top to the atmosphere for the purpose of aerating the condensed water, a pipe or tube secured to the bottom of said drum and communicating with the steam-generator for conveying the vapor directly into said drum for initial distribution to said chambers, and a faucet for drawing off the condensed water.

2. A condenser comprising a cold-water reservoir having a bottom flange, a faucet for said reservoir, a condensed-water drum arranged within the reservoir and having a series of flat chambers secured to and communicating with said drum, a pipe or tube for conveying the vapor directly into said drum for distribution to said chambers, and serving to secure said reservoir and drum together, a tube entering one of said chambers to convey air to the condensed water, and faucets for drawing off the water from said drum and reservoir.

3. A condenser comprising a cold-water reservoir, a drum for the condensed water arranged in said reservoir and having a series of vertically-arranged chambers secured to and communicating with said drum, said chambers extending above said reservoir, a tube or pipe for conveying vapor directly into said drum for distribution to said chambers, and means for drawing off the water from said reservoir and drum.

In testimony whereof I affix my signature in presence of two witnesses.

JOHN F. CHASE.

Witnesses:
HUGH M. STERLING,
GEO. M. COPENHAVER.